June 28, 1955          B. A. SARD          2,711,995
METHOD AND APPARATUS FOR CONTROLLING WATER CONDITIONING
Filed July 25, 1951
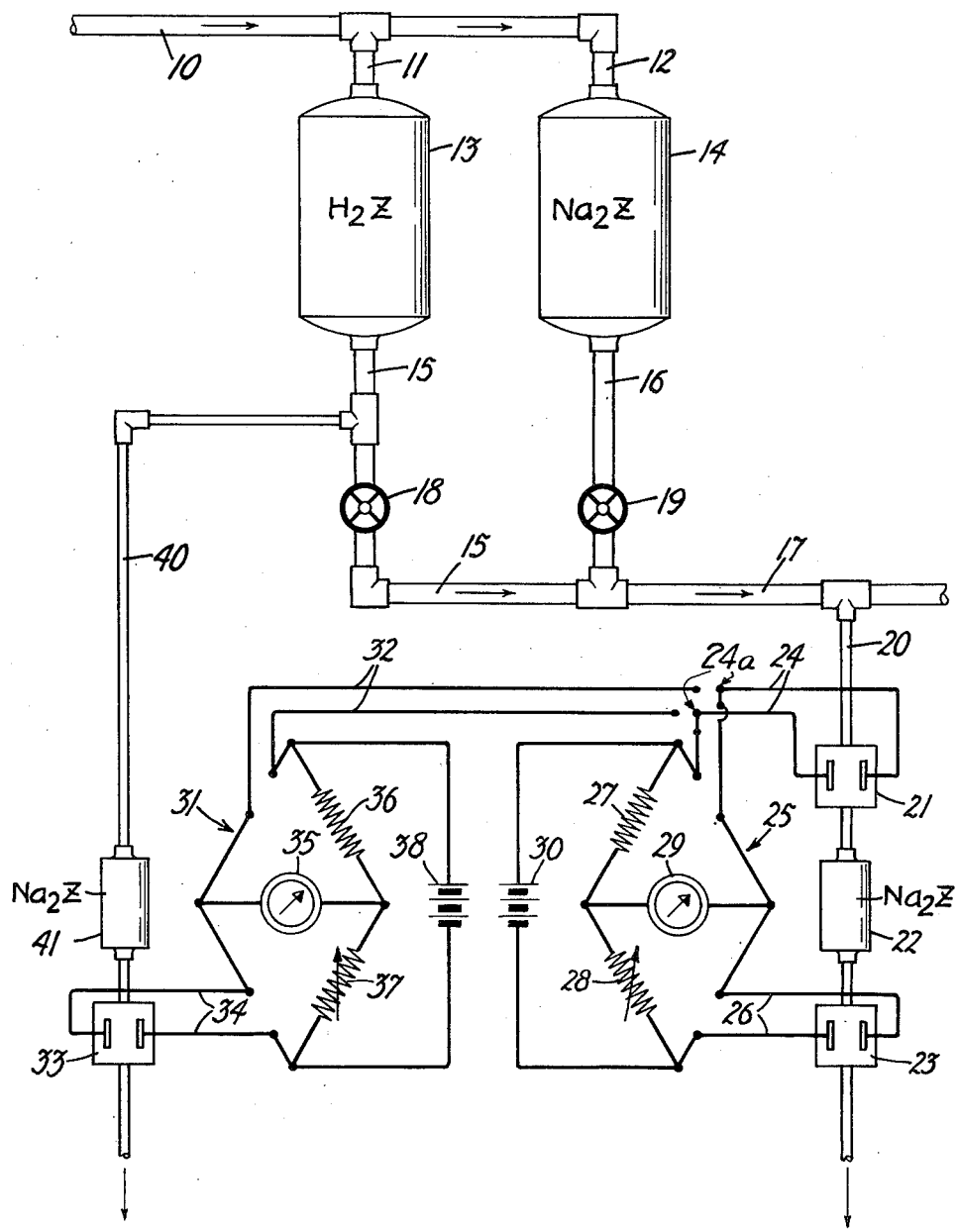
Inventor:
Bernard Abel Sard
by Clarence D. Kerr
Att'y.

United States Patent Office 2,711,995
Patented June 28, 1955

2,711,995

METHOD AND APPARATUS FOR CONTROLLING WATER CONDITIONING

Bernard Abel Sard, Osterley, England, assignor to The Permutit Company, New York, N. Y., a corporation of Delaware Application July 25, 1951, Serial No. 238,534

Claims priority, application Great Britain November 28, 1950

10 Claims. (Cl. 210—24)

This invention relates to the control of a process of conditioning water by ion exchange in which water containing bicarbonate is passed through a hydrogen cation exchange unit and in which the effluent is then blended in the desired proportions with raw water or softened water containing bicarbonate.

Certain natural or raw waters contain appreciable amounts of hardness and also bicarbonates or alkalinity. The conditioning of large quantities of such water for certain uses, such as for use as boiler feed water, to obtain sufficient purity to satisfy these exacting requirements of use, presents a very real problem. The treated water should be fully softened and the alkalinity or bicarbonates in the water should be reduced to as low a level as possible without producing any free mineral acidity in the treated water. Various ion exchange conditioning methods have been tried to accomplish this result. The only practical and economical method used heretofore has involved the use of a hydrogen exchange unit operated in parallel with a sodium exchange unit, with the effluents from the two exchange units being blended.

The raw water to be treated has been divided into two streams, one of which was passed through the hydrogen exchange unit and the other through the sodium exchange unit. The streams of treated water or effluents from these two units have then been blended together in the right proportions to produce the desired result. In such a process, the portion of the raw water passed through the hydrogen exchange unit has the cations of salts dissolved in the water exchanged for hydrogen. When, as is usually the case, the raw water contains substantial quantities of sulfates and/or chlorides, the effluent from this hydrogen unit not only is softened and has its bicarbonate converted to carbonic acid which is easily dissociated into $CO_2$ gas and water, but also contains as a result of this exchange reaction appreciable quantities of free mineral acids such as sulfuric and hydrochloric acids. The portion of the raw water passed through the sodium exchange unit is fully softened by exchange of calcium and magnesium cations for sodium cations, but the bicarbonates in the water are left unchanged so that the effluent from the sodium unit has just as much alkalinity or bicarbonates in it as the raw water had.

The object of blending these two effluents or streams is to proportion them in such a way that the free mineral acids in the hydrogen exchange effluent are all neutralized by conversion of the bicarbonates in the sodium exchange unit effluent to carbonic acid. If these acids are not all neutralized, the resulting blended effluent will contain free mineral acid which would, of course, be undesirable in water to be used for boiler feed water or other purposes. It is also desirable to proportion these streams during blending so that most of the bicarbonates will be destroyed by the mineral acids yielding carbon dioxide gas which can be removed in any conventional manner. In other words, it is desirable to maintain the proportions blended so that the net alkalinity of bicarbonates in the blended water will be reduced to as low a level as possible.

In cases where the raw water is not particularly hard, or where it is not important to obtain a fully softened water, the sodium exchange unit may be omitted and the effluent from the hydrogen exchange unit is simply blended with sufficient raw or untreated water to neutralize the free mineral acidity in the hydrogen exchange effluent.

The control of such a blending water conditioning process presents a real problem since the composition of the raw water may vary somewhat from time to time and the operating or effective capacities of the hydrogen and/or sodium exchange units do not remain constant throughout a given run. One unit may become partially exhausted before the other one does.

It is an object of this invention to provide a simple but effective means for indicating immediately the presence of free mineral acidity in the combined or blended water, thus making it possible to adjust quickly the proportions of the two streams of water blended to correct this difficulty.

Another object of the invention is to provide a simple means for indicating any substantial increase in alkalinity or bicarbonate in the blended water so that any substantial increase in alkalinity in the blend can be quickly corrected to the desired predetermined low level.

The invention will be described in conjunction with the figure in the drawing which shows, more or less diagrammatically, an arrangement for conditioning water by the blending method, the apparatus being equipped with means for indicating the presence of free mineral acid, and also means for indicating substantial increases in the alkalinity, in the blended or conditioned water.

Referring to the drawing, the raw water to be treated is received through a pipe 10 and divided into two streams which pass through the branch pipes 11 and 12, respectively, into a hydrogen cation exchange unit 13 and a sodium cation exchange unit 14. These hydrogen and sodium exchange units may be of conventional structure and design, and the provisions for backwashing, regenerating and rinsing are not shown.

The hydrogen exchange unit 13 is periodically regenerated with a dilute acid solution and the sodium exchange unit 14 is periodically regenerated with a dilute salt solution. The effluent from the hydrogen exchange unit 13 is drawn off through a pipe 15 and mixed or blended with the effluent from the sodium exchange unit drawn off through the pipe 16, the blended effluents being carried to service through the common pipe 17. By properly adjusting the valve 18 in the pipe 15 and the valve 19 in the pipe 16, the desired or correct proportion of these effluents can be mixed together to form the blend.

The foregoing portion of the installation and operation is shown only diagrammatically because it is conventional and will be easily understood by those skilled in the art. It will also be understood that in certain installations the sodium exchange unit 14 may be simply by-passed or omitted completely.

In accordance with my invention, a small portion of the blended streams is drawn off through a branch pipe 20 and passed successively through a conductivity cell 21, a small auxiliary sodium cation exchanging unit 22, and a second conductivity cell 23. The small stream of the effluent water may thereafter be returned to the main stream for service, may be discharged as waste, or used in some other manner in the process.

The electrodes in the conductivity cell 21 are connected by wires 24, 24 through a double pole double throw switch 24a to a Wheatstone bridge type of device, indicated generally at 25. In this manner the electrical resistance produced by the blended water passing between the electrodes in conductivity cell 21 forms one resistance or arm of the Wheatstone bridge 25. The electrodes in the conductivity cell 23 are similarly connected by the wires 26, 26 to form an opposing or balancing resistance or arm in the bridge 25. The bridge may be completed by a fixed resistance 27 and a balancing variable resistance 28 with a suitable galvanometer 29 designed to measure the flow of current across the center of the bridge. Voltage may be supplied to the outer ends of the bridge by means of a battery or other suitable source indicated at 30.

The operation of this portion of the device is as follows. The small stream of blended water is passed through the pipe 20, the conductivity cell 21, the sodium exchange unit 22, and the conductivity cell 23. The variable resistance 28 is adjusted so that the needle of the meter 29 reads zero or indicates that there is no flow of current across the center of the bridge when the resistances in the cells 21 and 23 are equal. As long as the blended water passing through the sodium exchange unit 22 does not contain any free acid, there will be no chemical change in the water as it is passed through this small auxiliary sodium exchange unit. Consequently, the conductivity of the water as measured in the cells 21 and 23 will be the same and the Wheatstone bridge 25 will remain in balance. However, as soon as any free mineral acidity appears in the blended water passing through the pipe 20, the hydrogen ions in this water will be replaced by sodium ions as the water passes through the auxiliary sodium exchange unit 22 and the conductivity of the water in the cell 21 will be higher than the conductivity of the water in cell 23, causing current to flow through the meter 29. The operator can then adjust the valve 18 to reduce the proportion of the water coming from the hydrogen exchange unit 13 or can adjust the valve 19 to increase the flow of water from the sodium exchange unit 14 to restore the desired condition in which the blend does not contain any free mineral acidity. It will be apparent, of course, that instead of operating this device manually, the meter 29 may be connected through any suitable form of relay to an alarm or to a device for making the necessary adjustments automatically.

The alkalinity in the combined or blended water passing through the pipe 17 is indicated or controlled by a second Wheatstone bridge, indicated generally at 31. One arm of this bridge is connected by the wires 32, 32 through the switch 24a to the conductivity cell 21, and the opposite or balancing resistance or arm of the bridge 31 is connected to a conductivity cell 33 by the wires 34, 34. The bridge is completed by a meter 35, fixed resistance 36, variable resistance 37 and battery 38 as in the case of the bridge 25. A portion of the effluent from the hydrogen exchange unit 13 is drawn off through the pipe 40 and passed through a second small auxiliary sodium exchange unit 41 and thence through the conductivity cell 33.

Water thus drawn off through the pipe 40 and treated in the auxiliary sodium exchange unit 41 will always be a perfect example of water that is free from mineral acidity and substantially free from any alkalinity. Thus, the conductivity of this small stream can be used as standard and the meter 35 can be adjusted by the variable resistance 37 to read zero when the model or standard water as indicated by the conductivity cell is the same as the conductivity of the water passing through the cell 21. Usually it is desirable to be on the safe side, and have a small proportion of alkalinity or bicarbonates in the blended water passing through the cell 21. If desired, the meter 35 may be calibrated in terms of alkalinity. Thus, when the alkalinity of the blended water passing through the cell 21 increases above a predetermined amount in relation to the conductivity of the water from the auxiliary unit 41, it will be quickly indicated by the meter 35, and the proper adjustment may be made either by reducing the flow of water through the valve 19 or increasing the flow of water slightly through the valve 18.

Here again, the meter 35 may, if desired, be connected through a conventional relay to an alarm or other automatic device for indicating when the alkalinity of the blended effluent exceeds the predetermined value or for making the necessary adjustment automatically when this occurs.

The auxiliary sodium exchange units 22 and 41 may be regenerated from time to time as needed by the usual sodium chloride solution. However, since the unit 22 does not ordinarily produce any chemical change in the water passing through it, the unit should be capable of long periods of operation between regenerations.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a process of conditioning hard water containing bicarbonate in which the water to be treated is divided into separate streams, passed through hydrogen and sodium cation exchange units, and the effluents from said units are blended, the procedure for controlling the proportions of the streams to be blended which comprises passing blended water through an additional sodium exchange unit, measuring the conductivities of the blended water before and after passing through such additional unit to determine the presence of free acid in the blended water, passing treated water from the hydrogen exchange unit through a second additional sodium unit, and measuring the conductivities of the effluent from said second additional unit and of the blended water to determine the amount of bicarbonate in the blended water.

2. In a process of conditioning hard water containing bicarbonate in which the water to be treated is divided into separate streams, passed through hydrogen and sodium cation exchange units, and the effluents from said units are blended, the procedure for controlling the proportions of the streams to be blended which comprises passing blended water through an additional sodium exchange unit, measuring the conductivities of the blended water before and after passage through such additional unit to detect the presence of free mineral acidity in the blended water, and adjusting the proportions of said effluents that are blended so that the conductivity of the blended water before passage through said additional unit does not exceed the conductivity of the effluent water after passage through said additional unit.

3. In a process of conditioning hard water containing bicarbonate in which the water to be treated is divided into separate streams, passed through hydrogen and sodium cation exchange units, and the effluents from said units are blended, the procedure for controlling the proportions of the streams to be blended which comprises passing treated water from the hydrogen exchange unit through an auxiliary sodium exchange unit, measuring the conductivities of the effluent from said auxiliary unit and of the blended water to determine the amount of bicarbonate in the blended water, and adjusting the proportions of said effluents that are blended so that said conductivities do not differ substantially from each other.

4. A process of controlling the conditioning of water containing bicarbonate in which a portion of the water is passed through a hydrogen exchange unit, and the effluent is then blended together with water containing bicarbonate which comprises measuring the conductivity of the blended water, passing some of the blended water through an additional sodium exchange unit, measuring the conductivity of the effluent from said additional unit, and adjusting the proportions of said waters blended together so that the conductivity of the blended water is not greater than the conductivity of the effluent from said additional unit.

5. A process of controlling the conditioning of water containing bicarbonate in which a portion of the water is passed through a hydrogen exchange unit, and the effluent is then blended together with water containing bicarbonate which comprises measuring the conductivity of the blended water, passing water from said hydrogen unit through a sodium exchange unit, measuring the conductivity of the effluent from said sodium unit, and adjusting the proportions of said waters blended together so that the conductivity of the blended water exceeds the conductivity of the effluent from said sodium unit only by a small predetermined amount.

6. A process of controlling the conditioning of water containing bicarbonate in which a portion of the water is passed through a hydrogen exchange unit, and the effluent is then blended together with water containing bicarbonate which comprises passing blended water through a first auxiliary sodium exchange unit, passing some of the hydrogen exchange effluent through a second auxiliary sodium exchange unit, measuring the conductivities of the blended water and of the effluents from each of said auxiliary units, and adjusting the proportions of the waters blended together so that the conductivity of the blended water does not exceed the conductivity of the effluent from said first auxiliary unit and exceeds the conductivity of the effluent from said second auxiliary unit by only a small predetermined amount.

7. In apparatus for conditioning hard water containing bicarbonate in which separate streams of the water to be treated are passed through hydrogen and sodium cation exchange units operated in parallel and the effluents therefrom are blended together, a first auxiliary sodium exchange unit, means for passing at least some of the blended effluents through said first auxiliary unit, a second auxiliary sodium exchange unit, means for passing a portion of the hydrogen unit effluent through said second auxiliary unit, and means for comparing the conductivity of the blended water with the conductivities of the effluents from each of said auxiliary units.

8. In apparatus for conditioning hard water containing bicarbonate in which separate streams of the water to be treated are passed through hydrogen and sodium cation exchange units operated in parallel and the effluents therefrom are blended together, an auxiliary sodium exchange unit, means for passing some of the hydrogen exchange effluent through said auxiliary sodium exchange unit, and means for comparing the conductivity of the blended water with the conductivity of the effluent from said auxiliary unit.

9. In apparatus for conditioning hard water containing bicarbonate in which water to be conditioned is passed through a hydrogen cation exchange unit and the effluent is then blended with water containing bicarbonate to neutralize the free mineral acidity in said effluent, an auxiliary sodium exchange unit, means for passing some of the effluent from said hydrogen unit through said auxiliary sodium exchange unit, conductivity cells for measuring the conductivities of the blended water and of the effluent from said auxiliary unit, and a Wheatstone bridge for comparing said conductivities.

10. In apparatus for conditioning hard water containing bicarbonate in which water to be conditioned is passed through a hydrogen cation exchange unit and the effluent is then blended with water containing bicarbonate to neutralize the free mineral acidity in said effluent, a first auxiliary sodium exchange unit means for passing blended water through said first auxiliary sodium exchange unit, a second auxiliary sodium exchange unit, means for passing some of the effluent from said hydrogen unit through said second auxiliary sodium exchange unit, conductivity cells for measuring the conductivities of the blended water and of each of the effluents from said auxiliary units, and Wheatstone bridge devices for comparing the conductivity of the blended water with each of the conductivities of said effluents.

References Cited in the file of this patent

UNITED STATES PATENTS

| | | |
|---|---|---|
| 1,145,509 | Pike et al. | July 6, 1915 |
| 1,341,790 | Edelman | June 1, 1920 |
| 1,928,384 | McCanna | Sept. 26, 1933 |
| 2,226,743 | Riley | Dec. 31, 1940 |
| 2,287,284 | Behrman | June 23, 1942 |
| 2,351,648 | Whitlock | June 20, 1944 |
| 2,617,766 | Emmett et al. | Nov. 11, 1952 |
| 2,628,191 | Sard | Feb. 10, 1953 |

FOREIGN PATENTS

| | | |
|---|---|---|
| 569,660 | Great Britain | June 4, 1945 |